(12) United States Patent
Watazu

(10) Patent No.: US 9,785,301 B2
(45) Date of Patent: Oct. 10, 2017

(54) ADHESIVE LAYER EQUIPPED FILM-LIKE PRESSURE-SENSITIVE SENSOR, TOUCH PAD, TOUCH-INPUT FUNCTION EQUIPPED PROTECTIVE PANEL AND ELECTRONIC DEVICE, USING THE SENSOR

(71) Applicant: Nissha Printing Co., Ltd., Kyoto-shi (JP)

(72) Inventor: Yuji Watazu, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 14/759,954

(22) PCT Filed: Dec. 27, 2013

(86) PCT No.: PCT/JP2013/085047
§ 371 (c)(1),
(2) Date: Jul. 9, 2015

(87) PCT Pub. No.: WO2014/109257
PCT Pub. Date: Jul. 17, 2014

(65) Prior Publication Data
US 2015/0346881 A1    Dec. 3, 2015

(30) Foreign Application Priority Data

Jan. 10, 2013  (JP) ................................. 2013-002594

(51) Int. Cl.
*G06F 3/047* (2006.01)
*G06F 3/041* (2006.01)
(Continued)

(52) U.S. Cl.
CPC ................ *G06F 3/047* (2013.01); *G01L 1/16* (2013.01); *G06F 3/044* (2013.01); *G06F 3/045* (2013.01);
(Continued)

(58) Field of Classification Search
CPC ..... G06F 3/0414; G06F 3/04883; G01R 1/06; G01L 1/16; G01L 1/205
See application file for complete search history.

(56) References Cited

U.S. PATENT DOCUMENTS 7,554,246 B2 * 6/2009 Maruyama .............. G06F 3/011
310/328
2008/0018201 A1  1/2008 Matsumoto
(Continued)

FOREIGN PATENT DOCUMENTS

JP    62177063 U    11/1987
JP    2004125571 A    4/2004
(Continued)

*Primary Examiner* — Gerald Johnson
(74) *Attorney, Agent, or Firm* — The Webb Law Firm

(57) ABSTRACT

A film-like pressure-sensitive sensor capable of detecting a touch pressure in high accuracy, a touch pad, a protective panel having a touch-input function and an electronic device, all using the sensor. A film-like pressure-sensitive sensor with a frame-shaped adhesive layer on a rear face peripheral edge portion of the film-like pressure-sensitive sensor is provided. The film-like pressure-sensitive sensor includes a rectangular piezoelectric film, a detection electrode formed partially on a rear face of the piezoelectric film and a reference potential electrode formed on a front face of the piezoelectric film in such a manner as to be overlapped with the detection electrode. The detection electrode is formed continuously in a first frame-shaped region present across an inner boundary of the adhesive layer and a whole region adjacent to an inner side of the first frame-shaped region.

19 Claims, 18 Drawing Sheets

(51) Int. Cl.
*G09G 5/00* (2006.01)
*G06F 3/044* (2006.01)
*G06F 3/045* (2006.01)
*G01L 1/16* (2006.01)

(52) U.S. Cl.
CPC ........... *G06F 3/0414* (2013.01); *G09G 5/003* (2013.01); *G06F 2203/04105* (2013.01); *G09G 2300/0426* (2013.01)

(56) References Cited

U.S. PATENT DOCUMENTS

| | | | | |
|---|---|---|---|---|
| 2008/0100566 | A1* | 5/2008 | Miyasaka | G09G 3/3446 345/107 |
| 2010/0033442 | A1* | 2/2010 | Kusuda | G06F 3/045 345/173 |
| 2010/0214232 | A1* | 8/2010 | Chan | G06F 3/044 345/173 |
| 2010/0283762 | A1* | 11/2010 | Takusa | G06F 3/044 345/174 |
| 2011/0115738 | A1* | 5/2011 | Suzuki | G01L 1/205 345/173 |
| 2013/0027339 | A1* | 1/2013 | Kodani | G01L 1/16 345/173 |
| 2013/0027340 | A1 | 1/2013 | Kodani et al. | |
| 2013/0050150 | A1* | 2/2013 | Chang | G06F 3/0488 345/176 |

FOREIGN PATENT DOCUMENTS

| | | |
|---|---|---|
| JP | 2008027016 A | 2/2008 |
| JP | 2010108490 A | 5/2010 |
| JP | 2011221720 A | 11/2011 |

* cited by examiner (1) (2)(3) (4) (5)(6) (7)

ADHESIVE LAYER EQUIPPED FILM-LIKE PRESSURE-SENSITIVE SENSOR, TOUCH PAD, TOUCH-INPUT FUNCTION EQUIPPED PROTECTIVE PANEL AND ELECTRONIC DEVICE, USING THE SENSOR

CROSS-REFERENCE TO RELATED APPLICATIONS

This application is the United States national phase of International Application No. PCT/JP2013/085047 filed Dec. 27, 2013, and claims priority to Japanese Patent Application No. 2013-002594 filed Jan. 10, 2013, the disclosures of which are hereby incorporated in their entirety by reference.

BACKGROUND OF THE INVENTION

Technical Field

The present invention relates to an adhesive layer equipped film-like pressure-sensitive sensor (i.e. "film-like pressure-sensitive sensor having an adhesive layer"), a touch pad, a touch-input function equipped protective panel (i.e. "protective panel having a touch-input function"), and an electronic device, all using the sensor.

Background Art

In recent years, there has been conspicuously increasing popularity of an electronic device 100 having a touch-input function such as a smart phone, a tablet type multi-function terminal device (see FIG. 14). With such electronic devices having a touch-input function, a user can input information in a readily intuitive manner by touching an image displayed on a display unit such as a liquid crystal display, with his/her finger, a pen or the like or placing the finger or the like near the image, while viewing the image for reference.

FIG. 15 is a section view showing a general configuration of a touch-input face and its vicinity included in the electronic device 100 having a touch-input function. As shown in FIG. 15, the electronic device 100 having a touch-input function includes a display unit 101, a protective panel 102 having a touch-input function, the protective panel 102 having a picture-frame-shaped ornamental pattern 102a and covering the display unit 101, and a casing 103 formed concave (a panel fit-in portion 105) to provide a level difference for allowing fit-in therein of the touch-input function equipped protective panel 102 from the outside, and having, in its bottom face, a cavity 105a for the display unit 101 and a frame-shaped support portion 105b for supporting a peripheral edge portion of the touch-input function equipped protective panel 102.

The above-described touch-input function equipped protective panel 102 protects the display screen of the display unit 101 and also allows touch-input. Conventionally, there has been employed a touch panel configured to detect coordinates of a position(s) touched by an operator. For multi-function terminal device such as a smart phone, a tablet, a capacitive touch panel allowing multiple touch inputs (detection of two or more multiple points) is mainly used. In electronic devices with touch-input function for other applications, other types of touch panel such as resistive film type, etc. is also used. Further, as shown in FIG. 15, since the touch-input function equipped protective panel 102 is fitted to the casing 103 from its outside, the protective panel 102 is provided with the picture-frame-shaped ornamental pattern 102a for hiding in order to deprive visibility of "inconvenient" portions (wiring portion of the touch panel, wiring portion of the display unit, etc.) (see FIG. 14).

Further, the protective panel 102 is firmly supported to the support portion 105b of the casing 103 by a frame-shaped double-sided tape strip (adhesive layer) 8 provided in the rear face peripheral edge portion.

However, the touch-input function equipped protective panel 102 described above detects only coordinates of a position(s) touched by an operator, the panel 102 being incapable of detecting a pressing force of the operator's touch.

Then, it is conceivable to configure a touch-input function equipped protective panel such that on an entire rear face of the touch panel having a picture-frame-shaped ornamental pattern, a film-like pressure-sensitive sensor is affixed for detecting a pressing force of an operator's touch. As such film-like pressure-sensitive sensor as above, there is well-known, as disclosed in Patent Document 1, one configured such that between a pair of opposing transparent substrates, there are provided a transparent rectangular piezoelectric film having a pressure-sensitive layer having piezoelectric property, a transparent reference potential electrode formed on an entire front face of the piezoelectric film, and a transparent detection electrode formed on an entire rear face of the piezoelectric film (see Patent Document 1). Incidentally, in the case of the configuration with the addition of the film-like pressure-sensitive sensor thereto, the frame-shaped double-sided tape strip (adhesive layer) for fixing the touch-input function equipped protective panel is to be provided in a rear face peripheral edge portion of this film-like pressure-sensitive sensor.

RELATED ART DOCUMENT

Patent Document

Patent Document 1: Japanese Unexamined Patent Application Publication No. 2004-125571

SUMMARY OF THE INVENTION

Problem to be Solved by Invention

However, the film-like pressure-sensitive sensor utilizing piezoelectric property is a sensor having very high impedance. So, this sensor suffers such problems as vulnerability to noise influence, low sensitivity, etc. As a result, there was a problem of low accuracy in touch pressure detection.

Accordingly, the object of the present invention is to solve the above-described problem and to provide a film-like pressure-sensitive sensor capable of detecting touch pressure in high accuracy, a touch pad, a protective panel having a touch-input function, and an electronic device, all using this sensor.

Solution

For accomplishing the above-noted object, the present inventor made study on a charge that develops in a piezoelectric film when pressed, when the film-like pressure-sensitive sensor is assembled in an electronic device.

Specifically, a film-like pressure-sensitive sensor having a piezoelectric film sandwiched between a reference potential electrode and a detection electrode is affixed to an entire rear face of a resin plate, with its periphery alone being fixed to a casing by a double-sided tape (adhesive layer). Under this state, when the resin plate is pressed from above with a finger, due to distribution of stress applied to the piezoelectric film, there occurs corresponding distribution in the electric charge generated from the piezoelectric film.

FIG. 13 shows a condition in which the resin plate having the film-like pressure-sensitive film affixed thereto is pressed down and flexed. As the piezoelectric film used in the film-like pressure-sensitive sensor is polarized along a direction of its thickness, a voltage corresponding to the stress in the thickness direction is outputted. As described below, differences will occur in the stresses along the thickness direction among different positions.

Firstly, in a center region and an outer region of the double-sided tape (adhesive layer) denoted by (1) and (7) respectively, almost no flexion occurs in comparison with the other regions, with presence of slight compression alone therein. In regions denoted by (2) and (6) closer to the inner ends of the double-sided tape (adhesive layer), these regions are flexed upwardly convexly, thus applying a stress to the piezoelectric film which stress tends to expand the film in its thickness direction. Conversely, a region denoted by (4) distant from the double-sided tape (adhesive layer) is flexed downwardly convexly, thus applying a stress to the piezoelectric film which stress tends to compress the film in its thickness direction. And, in regions denoted by (3) and (5) adjacent to the inner boundaries of the double-sided tape (adhesive layer), stress concentration occurs most likely, which stress tends to compress the piezoelectric film.

Based on the above, difference of sensitivity appears, depending on the position. Further, the sign of output value will be reverse (opposite) between positive and negative, depending on whether the piezoelectric film is compressed or expanded (in the following discussion, voltages outputted from (3) and (5) when depressed will be referred to as "positive outputs" and voltages having the opposite sign to the positive outputs will be referred to as "reverse outputs", respectively).

As shown in FIG. 13, it is considered that change in voltage occurs conspicuously near the regions fixed to/by the double-sided tape (adhesive layer). Whereas, the regions (1), (7), i.e. the center region and the outer region of the double-sided tape (adhesive layer) have low sensitivity. And, the regions denoted by (2), (6) closer to the inner ends of the double-sided tape (adhesive layer) are the regions of reverse outputs. The regions denoted by (3), (5) near the inner boundaries of the double-sided tape (adhesive layer) provide positive outputs and exhibit high sensitivity. The region denoted by (4) far from the double-sided tape (adhesive layer) provides stress distribution having a maximum value at the pressed point.

The present invention utilizes the above-described observation of a stress applied to a film-like pressure-sensitive sensor having its periphery fixed being different depending on a position at the time of pressing of this film-like pressure-sensitive sensor. The invention is configured as described below.

Namely, according to a first mode of configuration of the present invention, an adhesive layer equipped film-like pressure-sensitive sensor comprising:

a film-like pressure-sensitive sensor; and an adhesive layer being a frame-shaped adhesive layer disposed in a rear face peripheral edge portion of the film-like pressure-sensitive sensor;

the film-like pressure-sensitive sensor including a rectangular piezoelectric film, a detection electrode formed partially on a rear face of the piezoelectric film and a reference potential electrode formed on a front face of the piezoelectric film in such a manner as to be overlapped with the detection electrode; and the detection electrode being formed continuously in a first frame-shaped region (corresponding to (3), (5) described above) present across an inner boundary of the adhesive layer and a whole region (corresponding to (4) described above) adjacent to an inner side of the first frame-shaped region.

According to this first mode of configuration, compared with the case of forming the detection electrode on the entire face, due to exclusion of the regions (2), (6), it is possible to prevent the reverse outputs from these regions (2), (6) from affecting the sensitivity adversely. Incidentally, in this detailed disclosure, in the case of the electrode being formed in the first frame-shaped region present across the inner boundary of the adhesive layer, this electrode need not necessarily be present across the inner boundary of the adhesive layer. Namely, the inner boundary or the outer boundary of the electrode can be in alignment with the inner boundary of the adhesive layer.

Further, according to a second mode of configuration of the present invention, an adhesive layer equipped film-like pressure-sensitive sensor comprising:

a film-like pressure-sensitive sensor; and an adhesive layer being a frame-shaped adhesive layer disposed in a rear face peripheral edge portion of the film-like pressure-sensitive sensor;

the film-like pressure-sensitive sensor including a rectangular piezoelectric film, a detection electrode formed partially on a rear face of the piezoelectric film and a reference potential electrode formed on a front face of the piezoelectric film in such a manner as to be overlapped with the detection electrode; and the detection electrode being formed in a first frame-shaped region (corresponding to (3), (5) described above) present across an inner boundary of the adhesive layer.

In this second mode of configuration, in comparison with the first mode of configuration, due to exclusion of the region (4) above, the sensitivity is lower correspondingly. However, thanks to decrease in the electrode area, it can be less susceptible to noise than the first mode of configuration. Further, since the detection electrode is not formed in the region (4), visibility too is improved in comparison with the first mode of configuration.

Further, according to a third mode of configuration of the present invention, an adhesive layer equipped film-like pressure-sensitive sensor comprising:

a film-like pressure-sensitive sensor; and an adhesive layer being a frame-shaped adhesive layer disposed in a rear face peripheral edge portion of the film-like pressure-sensitive sensor;

the film-like pressure-sensitive sensor including a rectangular piezoelectric film, a detection electrode formed partially on a rear face of the piezoelectric film and a reference potential electrode formed on a front face of the piezoelectric film in such a manner as to be overlapped with the detection electrode; and the detection electrode being formed in a second frame-shaped region (corresponding to the regions (2), (6)) which is located adjacent to an outer side of a first frame-shaped region present across an inner boundary of the adhesive layer and which is also disposed in an inner peripheral edge portion of the adhesive layer.

In the case of this third mode of configuration, conversely from the first mode of configuration, only the reverse output from the regions (2), (6) is detected. Therefore, it is possible to prevent the positive outputs from the other regions from affecting the sensitivity adversely. Further, thanks to decrease in the electrode area, it is less susceptible to noise like the second mode of configuration. Moreover, since the detection electrode is not formed in the regions (3), (4), (5), visibility is further improved even in comparison with the second mode of configuration.

Further, according to a fourth mode of configuration of the present invention, an adhesive layer equipped film-like pressure-sensitive sensor comprising:

a film-like pressure-sensitive sensor; and an adhesive layer being a frame-shaped adhesive layer disposed in a rear face peripheral edge portion of the film-like pressure-sensitive sensor;

the film-like pressure-sensitive sensor including a rectangular piezoelectric film, a detection electrode formed partially on a rear face of the piezoelectric film and a reference potential electrode formed on a front face of the piezoelectric film in such a manner as to be overlapped with the detection electrode; and the detection electrode being formed continuously in a first frame-shaped region (corresponding to (3), (5) described above) present across an inner boundary of the adhesive layer and a whole region (corresponding to (4) described above) adjacent to an inner side of the first frame-shaped region and being formed independently also in a second frame-shaped region (corresponding to the regions (2), (6)) which is located adjacent to an outer side of the first frame-shaped region and which is also disposed in an inner peripheral edge portion of the adhesive layer.

In the case of this fourth mode of configuration, since only the regions (2), (6) provide reverse outputs, even higher sensitivity can be obtained by detecting the outputs of the regions (2), (6) and the outputs of the regions (3), (4), (5) differentially from each other (=subtraction).

Further, according to a fifth mode of configuration of the present invention, an adhesive layer equipped film-like pressure-sensitive sensor comprising:

a film-like pressure-sensitive sensor; and an adhesive layer being a frame-shaped adhesive layer disposed in a rear face peripheral edge portion of the film-like pressure-sensitive sensor;

the film-like pressure-sensitive sensor including a rectangular piezoelectric film, a detection electrode formed partially on a rear face of the piezoelectric film and a reference potential electrode formed on a front face of the piezoelectric film in such a manner as to be overlapped with the detection electrode; and the detection electrode being formed in a first frame-shaped region (corresponding to (3), (5) described above) present across an inner boundary of the adhesive layer and being formed independently also in a second frame-shaped region (corresponding to the regions (2), (6)) which is located adjacent to an outer side of a first frame-shaped region and which is also disposed in an inner peripheral edge portion of the adhesive layer.

In this fifth mode of configuration, in comparison with the fourth mode of configuration, due to exclusion of the region (4) above, the sensitivity is lower correspondingly. However, thanks to decrease in the electrode area, it is less susceptible to noise than the fourth mode of configuration. Further, since the detection electrode is not formed in the region (4), visibility too is improved in comparison with the fourth mode of configuration.

According to a sixth mode of configuration of the present invention, in the fifth mode of configuration, the detection electrode formed in the first frame-shaped region and the detection electrode formed in the second frame-shaped region have an approximately same width.

In this sixth mode of configuration, since two detection electrodes have an approximately same width, when a change of temperature occurs in the vicinities of these electrodes, a same amount of electric charge will be detected from both the electrodes as resulting from the pyroelectric effect. On the other hand, as to electric charges generated by the piezoelectric property at the time of pressing, the two detection electrodes will provide outputs which are reverse from each other. That is, through determination of a difference between the two detection electrodes, outputs due to the pyroelectric effect can be cancelled out.

Further, according to a seventh mode of configuration of the present invention, in any one of the second, third, fifth and sixth mode of configurations described above, the piezoelectric film has a rectangular opening portion in the inner side of the first frame-shaped region.

In this seventh mode of configuration, since the piezoelectric film has an opening portion, even when the film-like pressure-sensitive sensor is disposed in the display unit, its display screen is not hidden by the piezoelectric film, so visibility is improved.

Further, according to an eighth mode of configuration of the present invention, in any one of the first through seventh modes of configuration described above, the detection electrode is formed on the front face of the piezoelectric film and the reference potential electrode is formed on the rear face of the piezoelectric film, in reverse arrangement.

In this eighth mode of configuration, even with the above-described vertical disposing position switchover between the detection electrode and the reference potential electrode, the same advantageous effect as those respectively of the adhesive layer equipped film-like pressure-sensitive sensor according to the first through seventh modes of configuration can be achieved.

Further, according to a ninth mode of configuration of the present invention, a touch pad comprises:

the adhesive layer equipped film-like pressure-sensitive sensor according to any one of the first through eighth modes of configuration;

a touch panel having a touch-input face, the touch panel being non-transparent entirely; and the touch panel and the adhesive layer equipped film-like pressure-sensitive sensor being stacked as separate members.

In this ninth mode of configuration, not only coordinates of a position touched by an operator, but also its pressing force can be detected, and the advantageous effects respectively of the adhesive layer equipped film-like pressure-sensitive sensors according to any one of the first through seventh modes of configuration can be achieved.

Further, according to a tenth mode of configuration of the present invention, a touch-input function equipped protective panel comprises:

the adhesive layer equipped film-like pressure-sensitive sensor according to any one of the first through eighth modes of configuration, with the piezoelectric film, the detection electrode and the reference potential electrode thereof being transparent;

a touch panel having a touch-input face and a picture-frame-shaped ornamental pattern; and the touch panel and the adhesive layer equipped film-like pressure-sensitive sensor being stacked as separate members.

In this tenth mode of configuration, not only coordinates of a position touched by an operator, but also its pressing force can be detected, and the advantageous effects respectively of the adhesive layer equipped film-like pressure-sensitive sensors according to any one of the first through seventh modes of configuration can be achieved.

Further, according to an eleventh mode of configuration of the present invention, a touch-input function equipped protective panel, comprises:

the adhesive layer equipped film-like pressure-sensitive sensor according to any one of the first through eighth modes of configuration, with the piezoelectric film, the detection electrode and the reference potential electrode thereof being transparent;

a touch panel having a touch-input face and a picture-frame-shaped ornamental pattern; and one of two layers of position detecting electrodes constituting the touch panel being formed by the electrode formed on the front face of he piezoelectric film.

In this eleventh mode of configuration, not only coordinates of a position touched by an operator, but also its pressing force can be detected, and the advantageous effects respectively of the adhesive layer equipped film-like pressure-sensitive sensors according to any one of the first through seventh modes of configuration can be achieved. Moreover, in comparison with the ninth mode of configuration, due to the co-use of the electrode, it is possible to reduce the number of steps and the thickness.

Further, according to a twelfth mode of configuration of the present invention, an electronic device comprises:

a display unit;

the touch-input function equipped protective panel according to the tenth or eleventh mode of configuration; and a casing formed concave to provide a level difference for allowing fit-in of the touch-input function equipped protective panel from the outside, the casing including in its bottom face a cavity or an opening portion for the display unit and a frame-shaped support portion for supporting a peripheral edge portion of the touch-input function equipped protective panel.

This twelfth mode of configuration provides the advantageous effects of the film-like pressure-sensitive sensor according to the first through eighth modes of configurations.

Effects of the Invention

According to the present invention, since the film-like pressure-sensitive sensor employs the configurations having particular detection electrode pattern associated with the frame-shaped adhesive layer for fixation to the casing as described above, noise susceptibility is improved and sensitivity is increased, so that a pressing force of an operator's touch can be detected with high accuracy.

DETAILED DESCRIPTION OF THE INVENTION

Next, respective embodiments of the present invention will be explained with reference to the accompanying drawings.

First Embodiment

<Adhesive Layer Equipped Film-Like Pressure-Sensitive Sensor>

Firstly, a configuration of an adhesive layer equipped film-like pressure-sensitive sensor 9 (i.e. "film-like pressure-sensitive sensor with adhesive layer") according to this embodiment will be explained.

Figure 1:
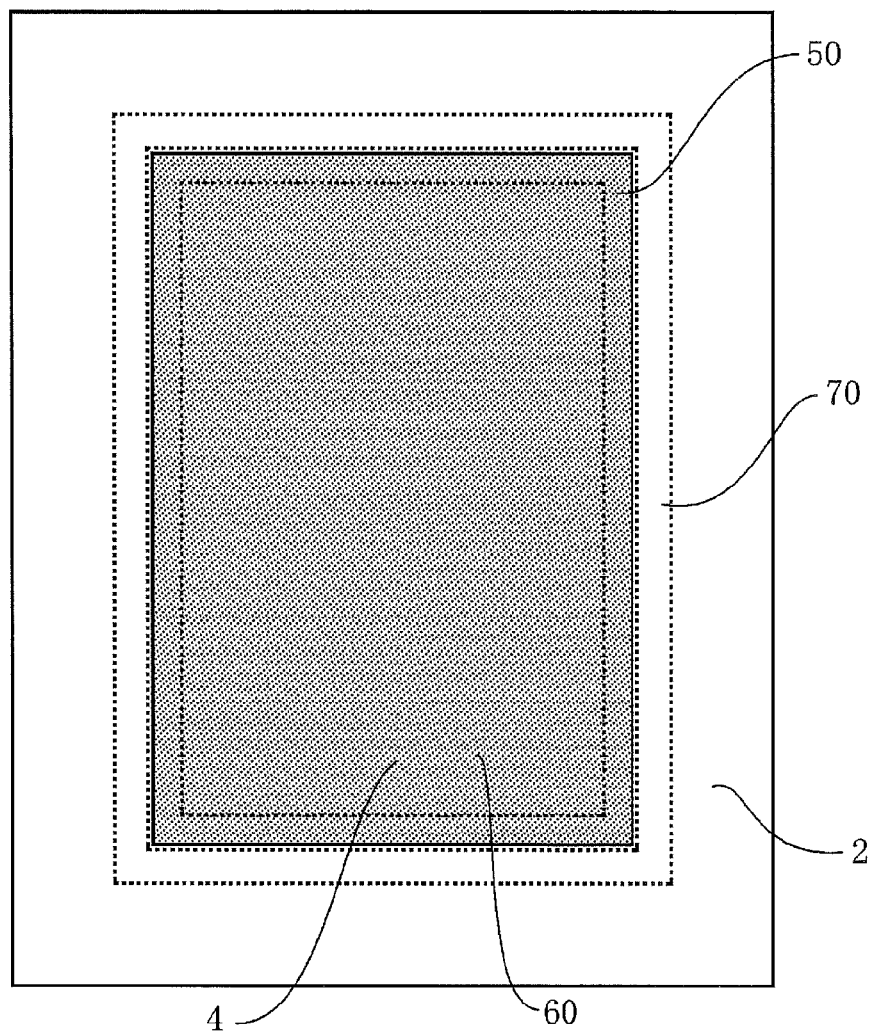
FIG. 1 is an explanatory view showing forming position of a detection electrode in an adhesive layer equipped film-like pressure-sensitive sensor used in a first embodiment of the present invention.
Figure 2:
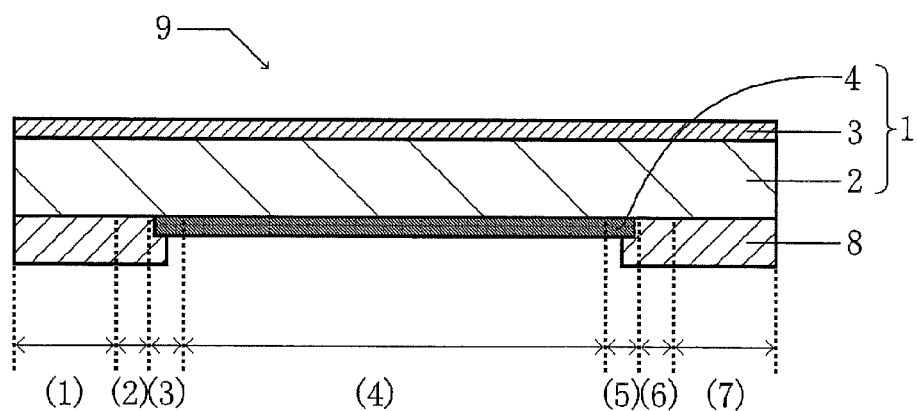
FIG. 2 is a section view showing the adhesive layer equipped film-like pressure-sensitive sensor used in the first embodiment of the present invention.

FIG. 1 is an explanatory view showing forming position of a detection electrode in an adhesive layer equipped film-like pressure-sensitive sensor used in the first embodiment of the present invention. FIG. 2 is a section view showing the adhesive layer equipped film-like pressure-sensitive sensor used in the first embodiment of the present invention.

In the adhesive layer equipped film-like pressure-sensitive sensor 9 according to the first embodiment, as shown in FIG. 1 and FIG. 2, a frame-shaped adhesive layer 8 is disposed in a rear face peripheral edge portion of a film-like pressure-sensitive sensor 1; and the film-like pressure-sensitive sensor 1 includes a rectangular transparent piezoelectric film 2, a transparent reference potential electrode 3 formed on an entire front face of the piezoelectric film 2 and a transparent detection electrode 4 formed partially on a rear face of the piezoelectric film 2.

The piezoelectric film 2 is not particularly limited as long as it has piezoelectric property and transparency. A film containing vinylidene fluoride-tetrafluoroethylene copolymer, a film containing vinylidene fluoride-trifluoroethylene copolymer, a film containing polyvinylidene fluoride can be cited as some non-limiting examples. These films can be subject to a stretching treatment from the viewpoint of improvement of piezoelectric property. Here, the stretching is preferably stretching of from 3 to 10 times stretching in a single axis direction. This stretching treatment can be implemented by any well-known technique. Further, an additive can be contained therein as long as it will not impair its piezoelectric property or transparency.

In order to provide piezoelectric property to the above described film, i.e. a film containing vinylidene fluoride-tetrafluoroethylene copolymer, a film containing vinylidene fluoride-trifluoroethylene copolymer, a film containing polyvinylidene fluoride, etc., a polarization treatment can be effected thereto. This polarization treatment can be implemented by a corona discharging treatment, or any well-known technique. For instance, the film will be sandwiched between metal electrodes or the like and then, a direct current field of 30 to 400 MV/m will be applied thereto for from 0.1 second to 60 minutes.

Further, the thickness of the piezoelectric film 2 ranges normally from 1 to 200 μm, or more preferably 50 μm or less from the viewpoint of transparency. From the viewpoint of detection sensitivity for pressing force, the thickness may preferably range from 20 μm to 100 μm. The piezoelectric film can be a single layer or can be comprised of multiple layers.

The reference potential electrode 3 is not particularly limited as long as it has transparency. For instance, the electrode 3 can employ an inorganic material such as ITO (indium tin oxide) and tin oxide, or a conductive polymer such as thiophene type conductive polymer, polyaniline, and polypyrrole, etc.

Further, the reference potential electrode 3 can be formed directly on the piezoelectric film 2. But, it is preferred that the electrode 3 be formed separately on a transparent resin film 5 of polyethylene terephthalate or the like to be eventually affixed to the piezoelectric film 2 by PSA (Pressure-Sensitive Adhesive).

The detection electrode 4 can use a same or similar material as/to material used for the reference potential electrode 3. Further, for partial formation of the detection electrode 4, it is conceivable to employ a method of removing unnecessary portions by lithography or laser treatment after forming the electrode on the entire face, or such other method as directly forming the pattern by printing, etc.

Further, the detection electrode 4 too, like the reference potential electrode 3, is preferably formed on a transparent resin film 6 such as a polyethylene terephthalate or the like to be eventually affixed to the piezoelectric film 2 by PSA or the like.

The adhesive layer 8 is provided for fixing the film-like pressure-sensitive sensor 1 to a casing 103 of an electronic device 100 and this layer 8 is disposed in the form of a frame in a rear face peripheral edge portion of the film-like pressure-sensitive sensor 1. Incidentally, in this disclosure, the frame-shaped adhesive layer 8 is not limited to one which is completely closed. For instance, in case a speaker or the like is to be provided near the display screen as is the case with a smart phone, the frame-shaped adhesive layer 8 can be formed discontinuously at the disposing positon of such speaker or the like. As the adhesive layer 8, a double-sided tape, adhesive agent, etc. can be employed.

In a first embodiment, the detection electrode 4 is formed continuously in a first frame-shaped region 50 (regions (3), (5) in the section view) present across an inner boundary of the adhesive layer 8 and a whole region 60 (region (4) in the section view) adjacent to an inner side of the first frame-shaped region 50.

In this first embodiment, in comparison with a case of forming the detection electrode on an entire face, a second frame-shaped region 70 (regions (2), (6) in the section view) adjacent to the outer side of the first frame-shaped region 50 (regions (3), (5) in the section view) and disposed in the inner peripheral edge portion of the adhesive layer 8 is not included. Therefore, it is possible to prevent a reverse output of the second frame-shaped region 70 from affecting the sensitivity adversely. Therefore, a pressing force by an operator's touch can be detected with high accuracy.

<Touch-Input Function Equipped Protective Panel>

Next, a configuration of a touch-input function equipped protective panel (i.e. "protective panel having a touch-input function") 102 using the above-described adhesive layer equipped film-like pressure-sensitive sensor 9 will be explained.

Figure 3:
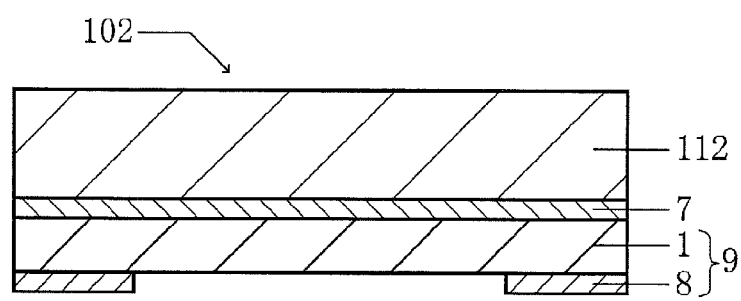
FIG. 3 is a section view showing a touch-input function equipped protective panel detecting both position coordinates and pressing force.

The touch-input function equipped protective panel 102, as shown in FIG. 3, includes the above-described adhesive layer equipped film-like pressure-sensitive sensor 9, and a touch panel 112 affixed to the entire front face of the adhesive layer equipped film-like pressure-sensitive sensor 9 by PSA 7 and having a picture-frame-like ornamental pattern.

Figure 4:
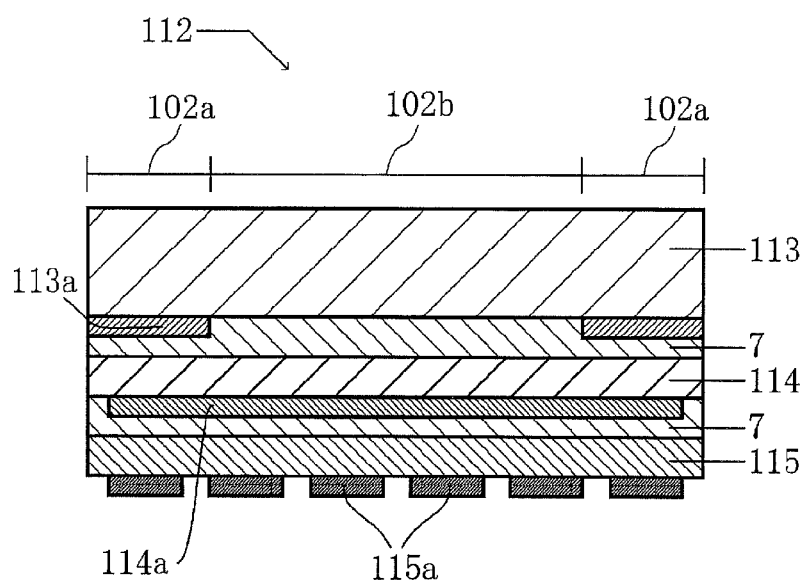
FIG. 4 is a section view showing one example of a touch panel.

The touch panel 112 is provided for detecting coordinates of a position touched by an operator. The operational type of this panel 112 is not particularly limited. For instance, a resistive film type or a capacitive type touch panel can be employed. In this case, there will be explained an example of using a capacitive type touch panel as the touch panel 112. The capacitive touch panel 112 can be configured for instance to include a protective panel body 113 acting as an input face, an X-coordinate detecting transparent film 114 having X-coordinate detecting electrodes 114a formed thereon, a Y-coordinate detecting transparent film 115 having Y-coordinate detecting electrodes 115a formed thereon, with these members 113, 114, 115 being stacked in the mentioned order and affixed to each other by the PSA 7 (see FIG. 4).

The protecting panel body 113 can employ a material having good transparency, rigidness and workability. For example, as the material forming the protective panel, it is possible to employ a glass plate or a plastic plate of engineering plastic such as polycarbonate type, polyamide type, polyether ketone type, acryl type, polyethylene terephthalate type, polybutylene terephthalate type, etc. On the rear face of the protective panel body 113, an ornamental layer 113a having a picture-frame-like ornamental pattern 102a is formed by application of ink. Incidentally, a portion 102b where the ornamental pattern 102a is not provided constitutes a transparent window portion.

As the ink constituting the ornamental layer 113a, it is possible to employ a colored ink containing a binder of resin such as polyvinyl chloride type resin, polyamide type rein, polyester type resin, polyacrylic type resin, polyurethane type resin, polyvinyl acetal type resin, polyester urethane type resin, cellulose ester type resin, alkyd resin and a pigment or dye of an appropriate color as a coloring agent. Further, the ornamental layer 113a can be formed by printing, rather than by application. In case the ornamental layer 113a is formed by printing, it is possible to employ such standard printing technique as offset printing, gravure printing, screen printing, etc.

<Electronic Device>

Next, there will be explained a configuration of the vicinity of the touch-input face of the electronic device 100 incorporating the touch-input function equipped protective panel 102 therein.

Figure 15:
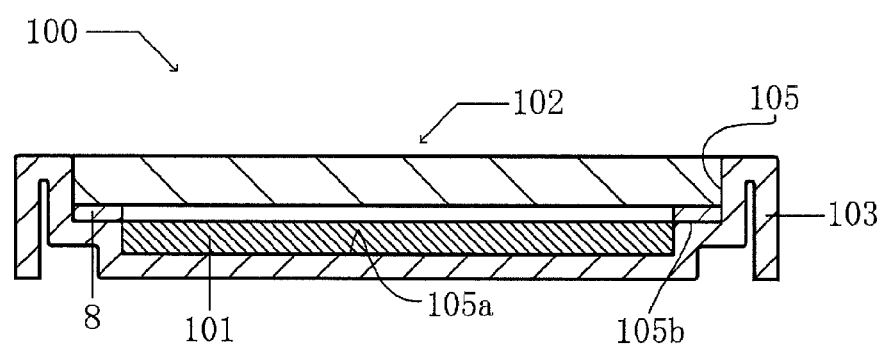
FIG. 15 is a section view showing a general arrangement around a touch-input face of the electronic device with the touch-input function.

The electronic device 100 shown in FIG. 15 includes a display unit 101, the touch-input function equipped protective panel 102 having the picture-frame-like ornamental pattern 102a and covering the display unit 101, and a casing 103 formed concave (a panel fit-in portion 105) to provide a level difference for allowing fit-in therein of the touch-input function equipped protective panel 102 from the outside, and having, it its bottom face, a cavity 105a for the display unit 101 and a frame-shaped support portion 105b for supporting a peripheral edge portion of the touch-input function equipped protective panel 102.

The display unit 101 can be a flat panel display (FPD) such as a liquid crystal display, an organic EL display, a plasma display, an electronic paper, etc.

The panel fit-in portion 105 of the casing 103 is formed concave to provide a level difference for allowing fit-in of the touch-input function equipped protective panel 102 from the outside. In the bottom face of the panel fit-in portion 105, the cavity 105a is provided for accommodating the display unit 101, and this cavity 105 accommodating the display unit 101 is covered by the touch-input function equipped protective panel 102 supported on the frame-shaped support portion 105b around this cavity 105a. Incidentally, instead of the cavity 105a, an opening portion can be provided which provides visibility of the display portion of the display unit 101.

The casing 103 can be formed of synthetic resin or metal such as aluminum. Further, this can be formed of a composite of synthetic resin and metal, with forming only the bottom face of the cavity 105a of a metal plate.

In the above, the first embodiment of the present invention has been described. However, the present invention is not limited to the first embodiment. For instance, second through fifth embodiments to be described next are also possible. Incidentally, in the second through fifth embodiments, members denoted with the same numerals/marks as those used in the first embodiment are same members as those of the first embodiment and explanation thereof will be omitted.

Second Embodiment

<Adhesive Layer Equipped Film-Like Pressure-Sensitive Sensor>

Figure 5:
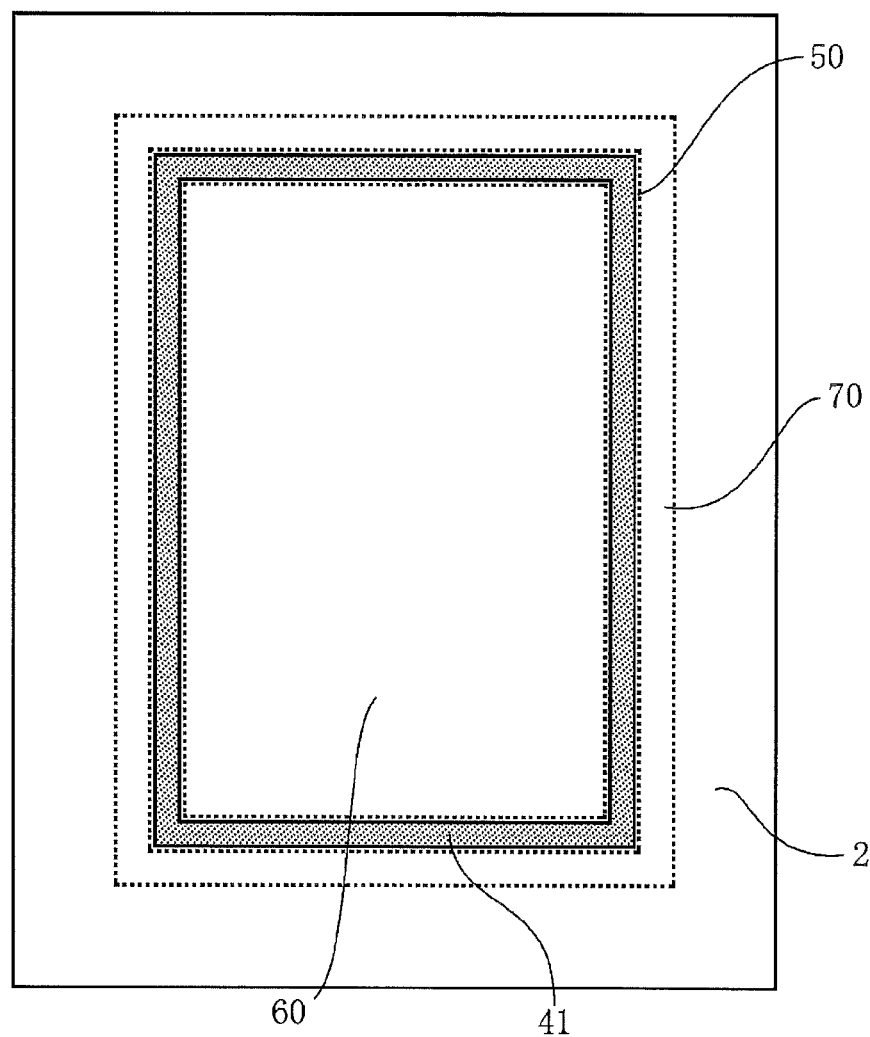
FIG. 5 is an explanatory view showing forming position of a detection electrode in an adhesive layer equipped film-like pressure-sensitive sensor used in a second embodiment of the present invention.
Figure 6:
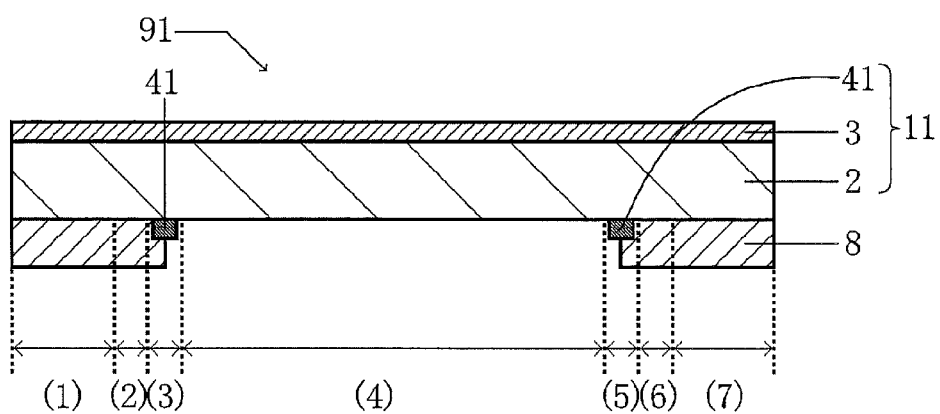
FIG. 6 is a section view showing the adhesive layer equipped film-like pressure-sensitive sensor used in the second embodiment of the present invention.

FIG. 5 is an explanatory view showing forming position of a detection electrode in an adhesive layer equipped film-like pressure-sensitive sensor used in a second embodiment of the present invention. FIG. 6 is a section view showing the adhesive layer equipped film-like pressure-sensitive sensor used in the second embodiment of the present invention.

In an adhesive layer equipped film-like pressure-sensitive sensor 91 in the second embodiment, as shown in FIG. 5 and FIG. 6, the frame-shaped adhesive layer 8 is provided in the rear face peripheral edge portion of the film-like pressure-sensitive sensor 11. And, the film-like pressure-sensitive sensor 11 includes the rectangular transparent piezoelectric film 2, the transparent reference potential electrode 3 formed on the entire front face of the piezoelectric film 2 and a transparent detection electrode 41 formed partially on the rear face of the piezoelectric film 2.

The detection electrode 41 used in the second embodiment is formed only in the first frame-shaped region 50 present across the inner boundary of the adhesive layer 8.

In this second embodiment, in comparison with the first embodiment, due to the exclusion of the whole region 60 (the region (4) in the section view) adjacent to the inner side of the first frame-shaped region 50, the sensitivity is lower correspondingly, but with corresponding decrease in the electrode area, it can be less susceptible to noise than the first embodiment. Further, since the detection electrode 41 is not formed in the region 60 (the region (4) in the section view), visibility is better also than the first embodiment.

Incidentally, the detection electrode 41 can employ the same material as used in the first embodiment. However, since it is hidden by the frame-like ornamental pattern 102a provided in the touch panel 112, a non-transparent material can be used also. For instance, it is possible to form it by vapor deposition, sputtering, or plating with aluminum, copper, silver, gold, etc. Thus, the touch panel 1 can be provided inexpensively.

<Touch-Input Function Equipped Protective Panel and Electronic Device>

As these are same as those of the first embodiment, except the detection electrode pattern of the film-like pressure-sensitive sensor, explanations thereof will be omitted.

Third Embodiment

<Adhesive Layer Equipped Film-Like Pressure-Sensitive Sensor>

Figure 7:
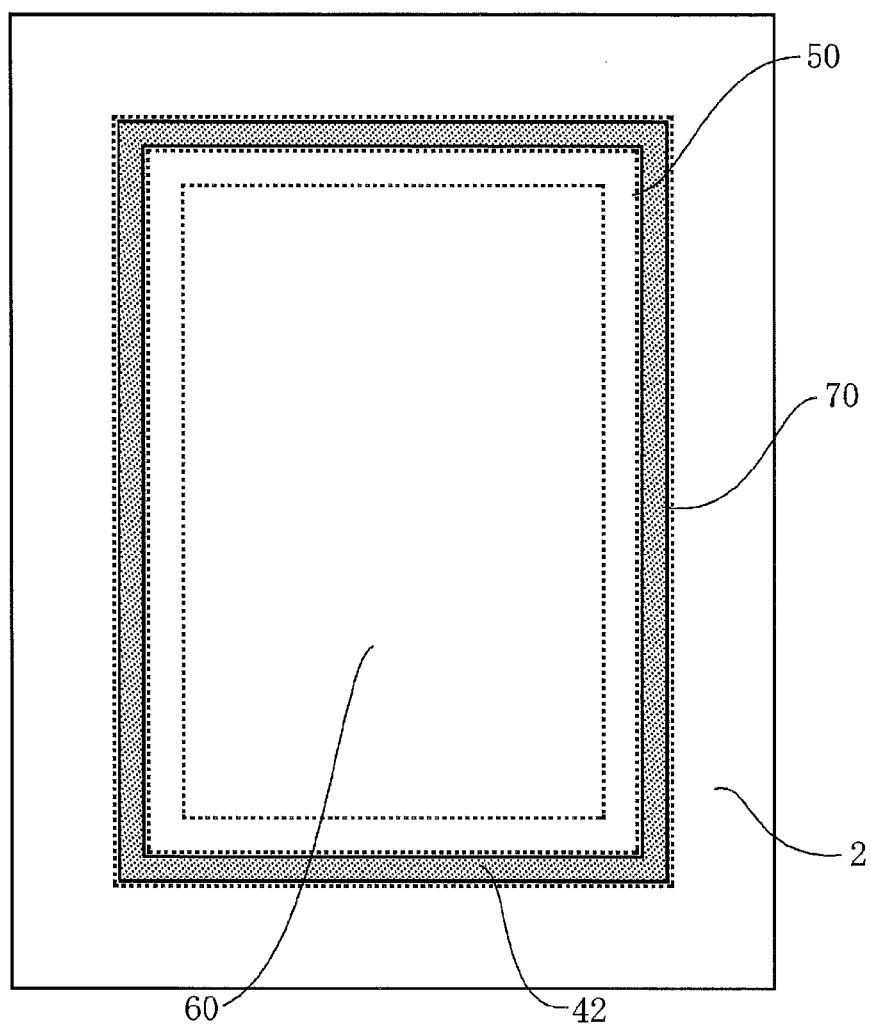
FIG. 7 is an explanatory view showing forming position of a detection electrode in an adhesive layer equipped film-like pressure-sensitive sensor used in a third embodiment of the present invention.
Figure 8:
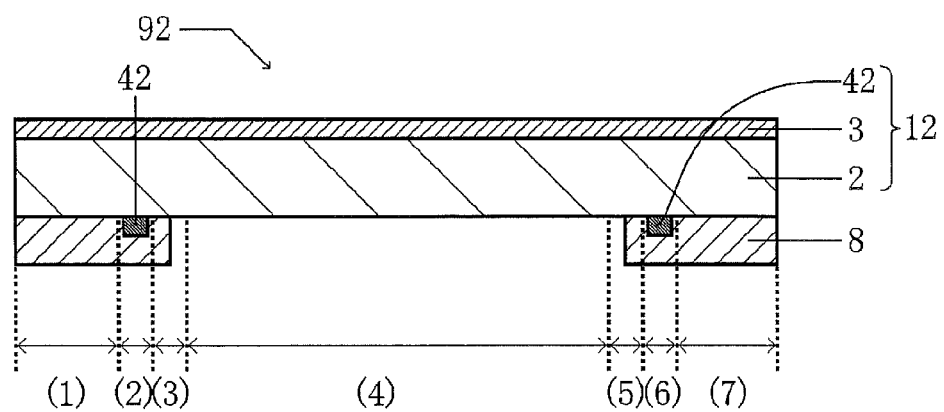
FIG. 8 is a section view showing the adhesive layer equipped film-like pressure-sensitive sensor used in the third embodiment of the present invention.

FIG. 7 is an explanatory view showing forming position of a detection electrode in an adhesive layer equipped film-like pressure-sensitive sensor used in a third embodiment of the present invention. FIG. 8 is a section view showing the adhesive layer equipped film-like pressure-sensitive sensor used in the third embodiment of the present invention.

In an adhesive layer equipped film-like pressure-sensitive sensor 92 in the third embodiment, as shown in FIG. 7 and FIG. 8, the frame-shaped adhesive layer 8 is provided in the rear face peripheral edge portion of a film-like pressure-sensitive sensor 12. And, the film-like pressure-sensitive sensor 12 includes the rectangular transparent piezoelectric film 2, the transparent reference potential electrode 3 formed on the entire front face of the piezoelectric film 2 and a transparent detection electrode 42 formed partially on the rear face of the piezoelectric film 2.

The detection electrode 42 used in the third embodiment is formed only in the second frame-shaped region 70 (regions (2), (6) in the section view) which is disposed adjacent to the outer side of the first frame-shaped region 50 (regions (3),(5) in the section view) present across the inner boundary of the adhesive layer 8 and located at the inner peripheral edge portion of the adhesive layer 8.

In the case of this third embodiment, conversely from the first embodiment, only the reverse output from the second frame-shaped region 70 (regions (2), (6) in the section view) is detected. Therefore, it is possible to prevent the positive outputs from the other regions from affecting the sensitivity adversely. Further, thanks to decrease in the electrode area, it is less susceptible to noise like the second embodiment. Moreover, since the detection electrode is formed in neither the region 50 (the regions (3), (5) in the section view) nor the region 60 (the region (4) in the section view), visibility is further improved even in comparison with the second embodiment.

Incidentally, the detection electrode 42 can employ the same material as used in the first embodiment. However, since it is hidden by the frame-like ornamental pattern 102*a* provided in the touch panel 112, a non-transparent material can be used also, like the second embodiment.

<Touch-Input Function Equipped Protective Panel and Electronic Device>

As these are same as those of the first embodiment, except the detection electrode pattern of the film-like pressure-sensitive sensor, explanations thereof will be omitted.

Fourth Embodiment

<Adhesive Layer Equipped Film-Like Pressure-Sensitive Sensor>

Figure 9:
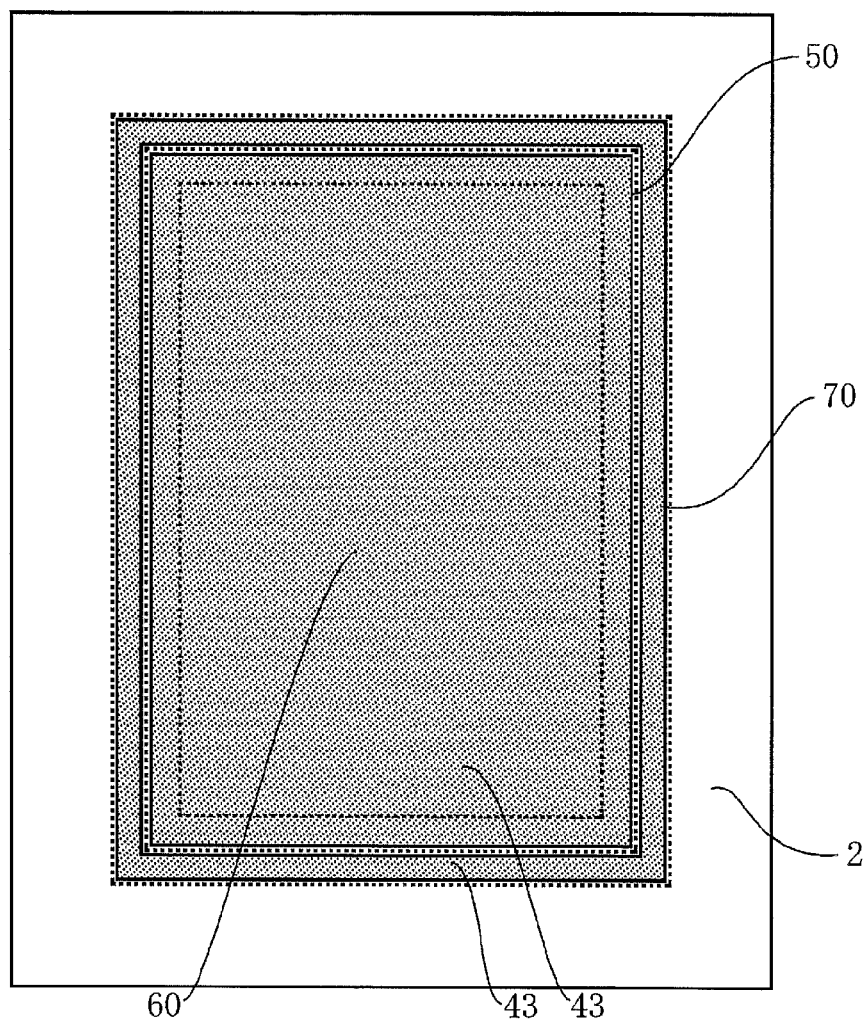
FIG. 9 is an explanatory view showing forming position of a detection electrode in an adhesive layer equipped film-like pressure-sensitive sensor used in a fourth embodiment of the present invention.
Figure 10:
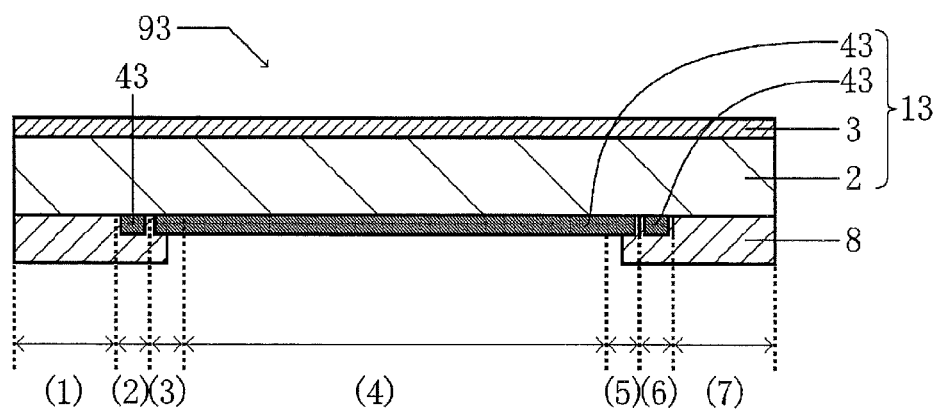
FIG. 10 is a section view showing the adhesive layer equipped film-like pressure-sensitive sensor used in the fourth embodiment of the present invention.

FIG. 9 is an explanatory view showing forming position of a detection electrode in an adhesive layer equipped film-like pressure-sensitive sensor used in a fourth embodiment of the present invention. FIG. 10 is a section view showing the adhesive layer equipped film-like pressure-sensitive sensor used in the fourth embodiment of the present invention.

In an adhesive layer equipped film-like pressure-sensitive sensor 93 in the fourth embodiment, as shown in FIG. 9 and FIG. 10, a frame-shaped adhesive layer 8 is provided in the rear face peripheral edge portion of a film-like pressure-sensitive sensor 13. And, the film-like pressure-sensitive sensor 13 includes the rectangular transparent piezoelectric film 2, the transparent reference potential electrode 3 formed on the entire front face of the piezoelectric film 2 and a transparent detection electrode 43 formed partially on the rear face of the piezoelectric film 2.

The detection electrode 43 used in the fourth embodiment is formed continuously in the first frame-shaped region 50 (the regions (3), (5) in the section view) present across the inner boundary of the adhesive layer 8 and the whole region 60 (the region (4) in the section view) adjacent to the inner side of the first frame-shaped region 50 and is formed independently also in the second frame-shaped region 70 (the regions (2), (6) in the section view) which is located adjacent to the outer side of the first frame-shaped region 50 and also disposed at the inner peripheral edge portion of the adhesive layer 8.

In the case of this fourth embodiment, since only the second frame-shaped region 70 (the regions (2), (6) in the section view) provide reverse output, even higher sensitivity can be obtained by detecting the outputs of the second frame-shaped region 70 and its inner side regions 50 and 60 (the regions (3), (4), (5) in the section view) differentially each other (=subtraction).

<Touch-Input Function Equipped Protective Panel and Electronic Device>

As these are same as those of the first embodiment, except the detection electrode pattern of the film-like pressure-sensitive sensor, explanations thereof will be omitted.

Fifth Embodiment

<Adhesive Layer Equipped Film-Like Pressure-Sensitive Sensor>

Figure 11:
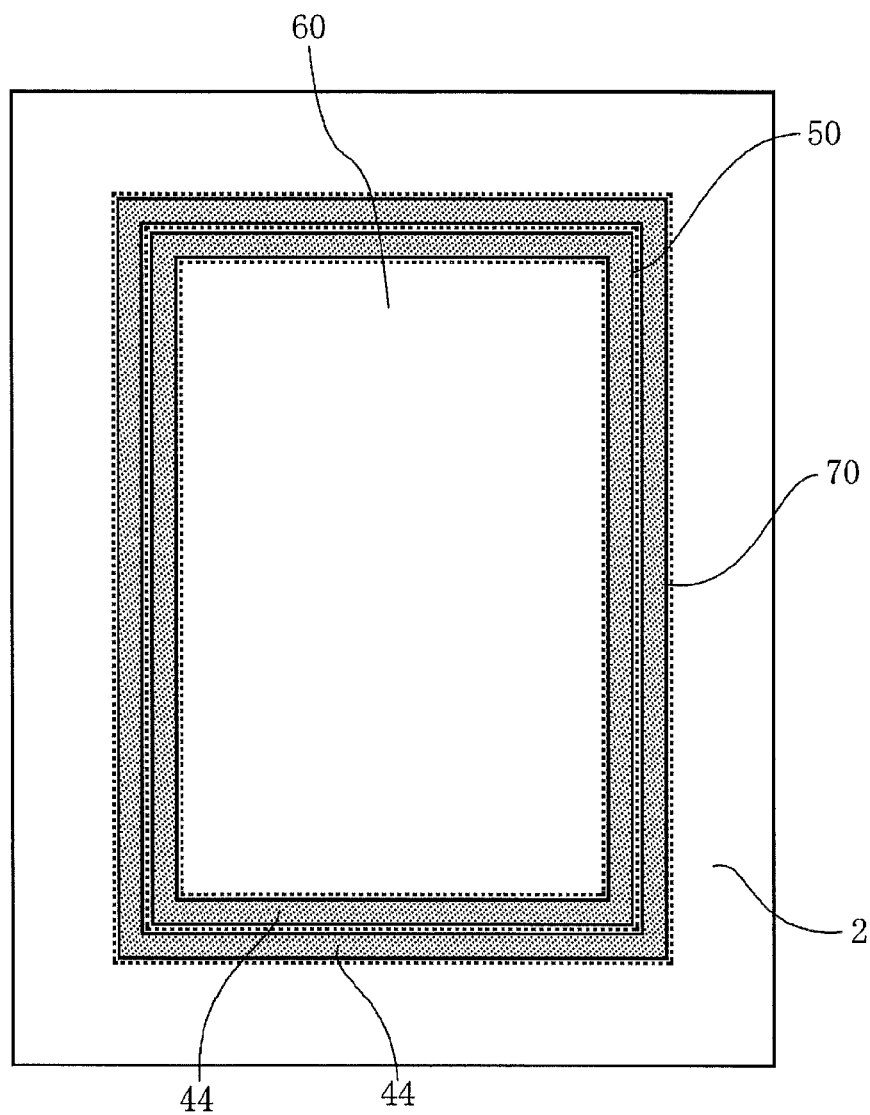
FIG. 11 is an explanatory view showing forming position of a detection electrode in an adhesive layer equipped film-like pressure-sensitive sensor used in a fifth embodiment of the present invention.
Figure 12:
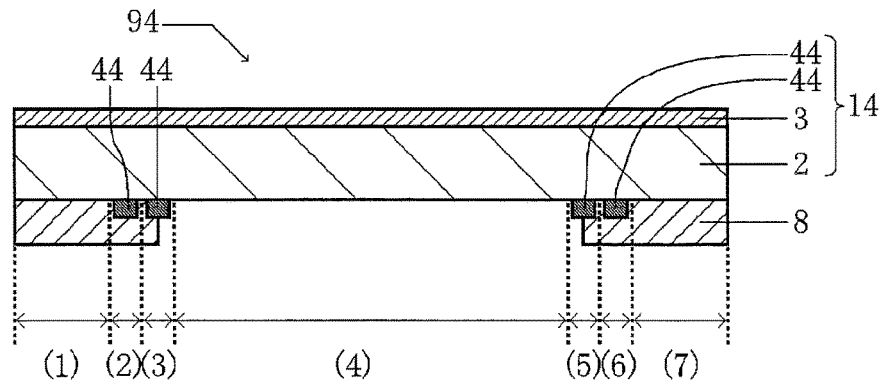
FIG. 12 is a section view showing the film-like adhesive layer equipped pressure-sensitive sensor used in the fifth embodiment of the present invention.
Figure 13:
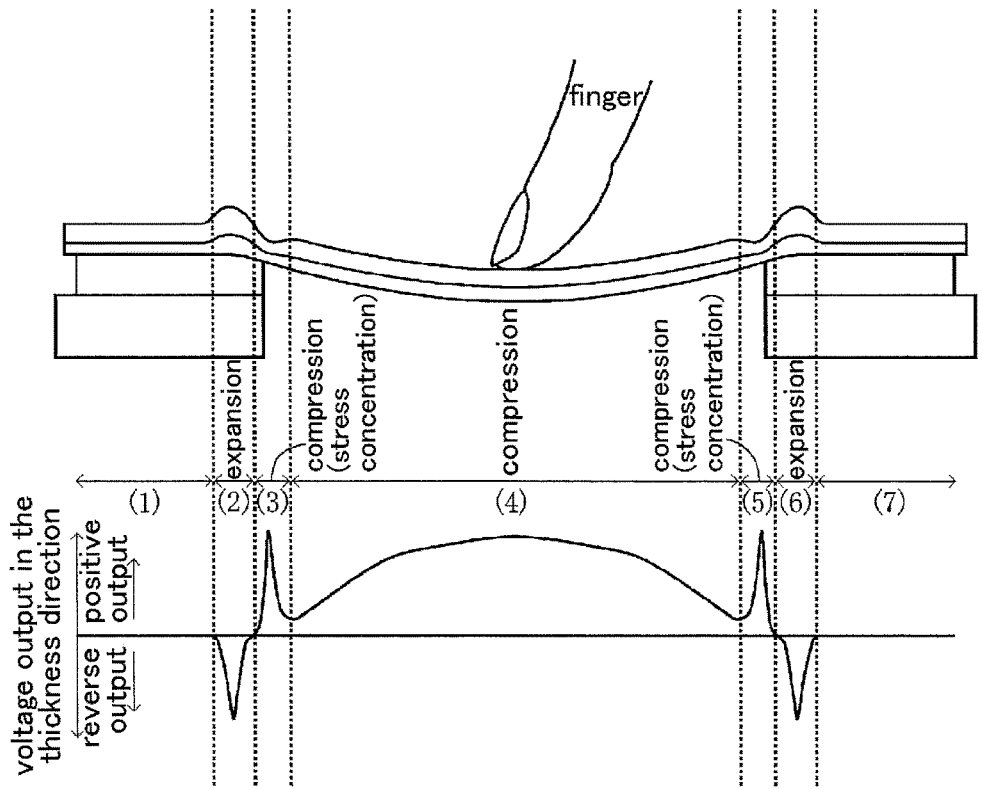
FIG. 13 is a view showing manners of flexion and voltage change amounts at various respective positions at the time of pressing when the film-like pressure-sensitive sensor is assembled in an electronic device.
Figure 14:
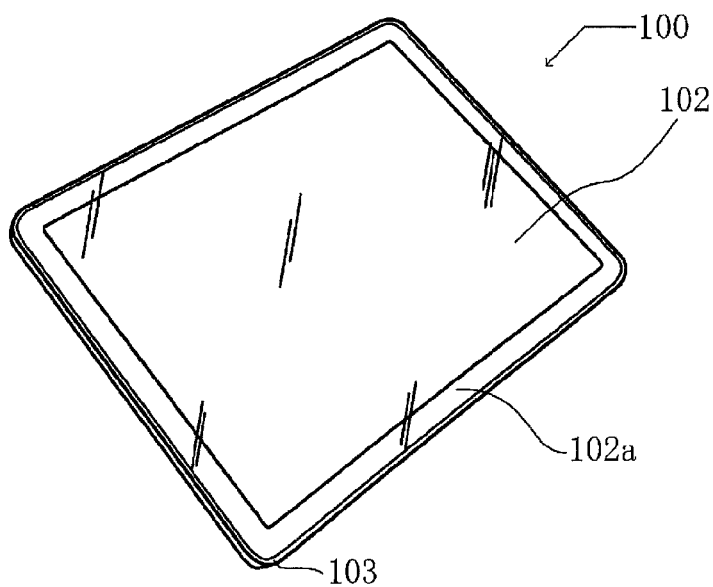
FIG. 14 is a view showing an example of a common electronic device having touch-input function.

FIG. 11 is an explanatory view showing forming position of a detection electrode in an adhesive layer equipped film-like pressure-sensitive sensor used in a fifth embodiment of the present invention. FIG. 12 is a section view showing the adhesive layer equipped film-like pressure-sensitive sensor used in the fifth embodiment of the present invention.

In an adhesive layer equipped film-like pressure-sensitive sensor 94 in the fifth embodiment, as shown in FIG. 11 and FIG. 12, the frame-shaped adhesive layer 8 is provided in the rear face peripheral edge portion of a film-like pressure-sensitive sensor 14. And, the film-like pressure-sensitive sensor 14 includes the rectangular transparent piezoelectric film 2, the transparent reference potential electrode 3 formed on the entire front face of the piezoelectric film 2 and a transparent detection electrode 44 formed partially on the rear face of the piezoelectric film 2.

The detection electrode 44 used in the fifth embodiment is formed in the first frame-shaped region 50 (the regions (3), (5) in the section view) present across the inner boundary of the adhesive layer 8 and is formed independently also in the second frame-shaped region 70 (the regions (2), (6) in the section view) which is located adjacent to the outer side of the first frame-shaped region 50 and also disposed at the inner peripheral edge portion of the adhesive layer 8.

In this fifth embodiment, in comparison with the fourth embodiment, due to exclusion of the entire region 60 (region (4) in the section view) adjacent to the inner side of the first frame-shaped region 50, the sensitivity is lower correspondingly. However, thanks to decrease in the electrode area, it is less susceptible to noise than the fourth (first) embodiment. Further, since the detection electrode 44 is not formed in the region 60 (the region (4) in the section view), visibility is also improved in comparison with the fourth embodiment. Moreover, in case the two detection electrodes have approximately same widths, output by pyroelectricity can be canceled out.

Incidentally, the detection electrode 44 can employ the same material as used in the first embodiment. However, since it is hidden by the frame-like ornamental pattern 102*a* provided in the touch panel 112, a non-transparent material can be used also, like the second embodiment.

<Touch-Input Function Equipped Protective Panel and Electronic Device>

As these are same as those of the first embodiment, except the detection electrode pattern of the film-like pressure-sensitive sensor, explanations thereof will be omitted.

In addition to the first through fifth embodiments above, variations as follows are also possible.

[Variation 1]

For instance, in the first through fifth embodiments, the detection electrodes 4, 41, 42, 43, 44 are formed on the rear face of the piezoelectric film 2 and the reference potential electrode 3 is formed on the front face of the piezoelectric film 2. The invention is not limited thereto. Namely, in reverse arrangement, the detection electrodes 4, 41, 42, 43, 44 may be formed on the front face of the piezoelectric film 2 and the reference potential electrode 3 may be formed on the rear face of the piezoelectric film 2.

[Variation 2]

In the first through fifth embodiments, the reference potential electrode 3 is formed on the whole face. The invention is not limited thereto. The reference potential electrode 3 need only be formed in the manner to be overlapped with the detection electrode 4, 41, 42, 43, 44. Here, the language "overlapped" means not only complete agreement/overlapping with the detection electrode 4, 41, 42, 43, 44, but also a case of the reference potential electrode 3 having a smaller or greater area than the detection electrode 4, 41, 42, 43, 44.

[Variation 3]

Further, in the first through fifth embodiments, the adhesive layer equipped film-like pressure-sensitive sensor and the touch panel having a touch-input face are stacked as separate members. The invention is not limited thereto. For instance, one of the two layers of the position detection electrodes constituting the touch panel can be constituted by an electrode formed on the front face of the piezoelectric film.

[Variation 4]

Figure 16:
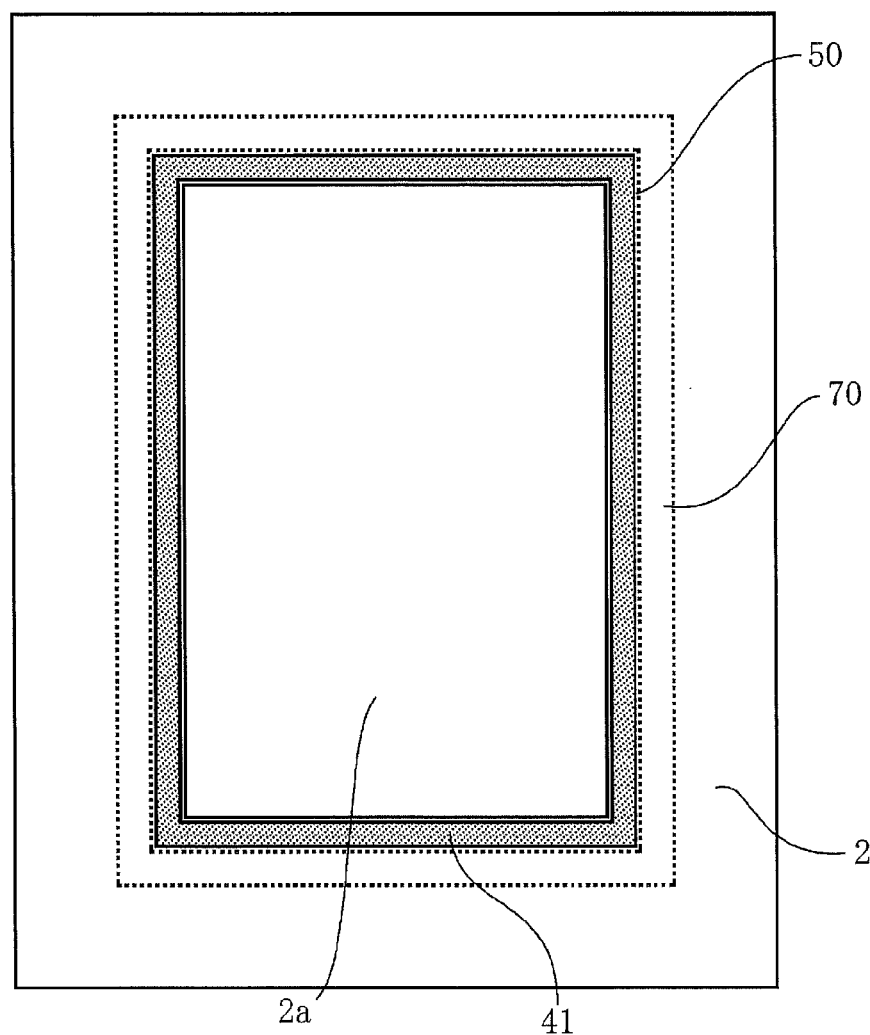
FIG. 16 is an explanatory view showing a variation of the adhesive layer equipped film-like pressure-sensitive sensor for use in the second embodiment.
Figure 17:
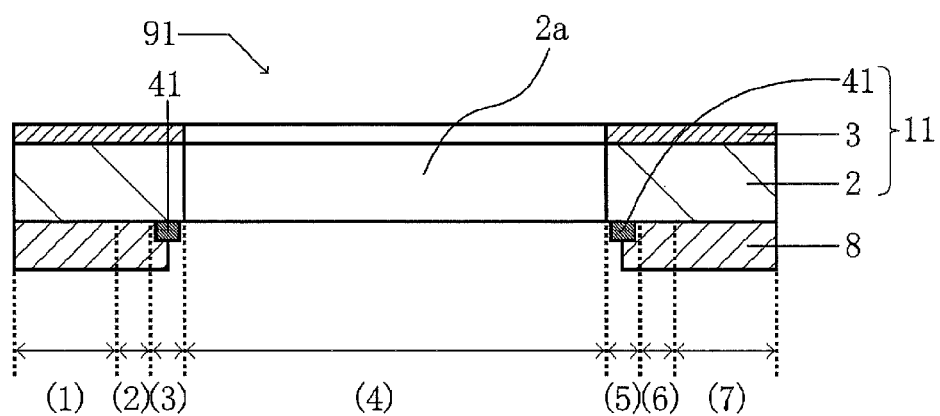
FIG. 17 is a section view showing a variation of the adhesive layer equipped film-like pressure-sensitive sensor for use in the second embodiment.
Figure 18:
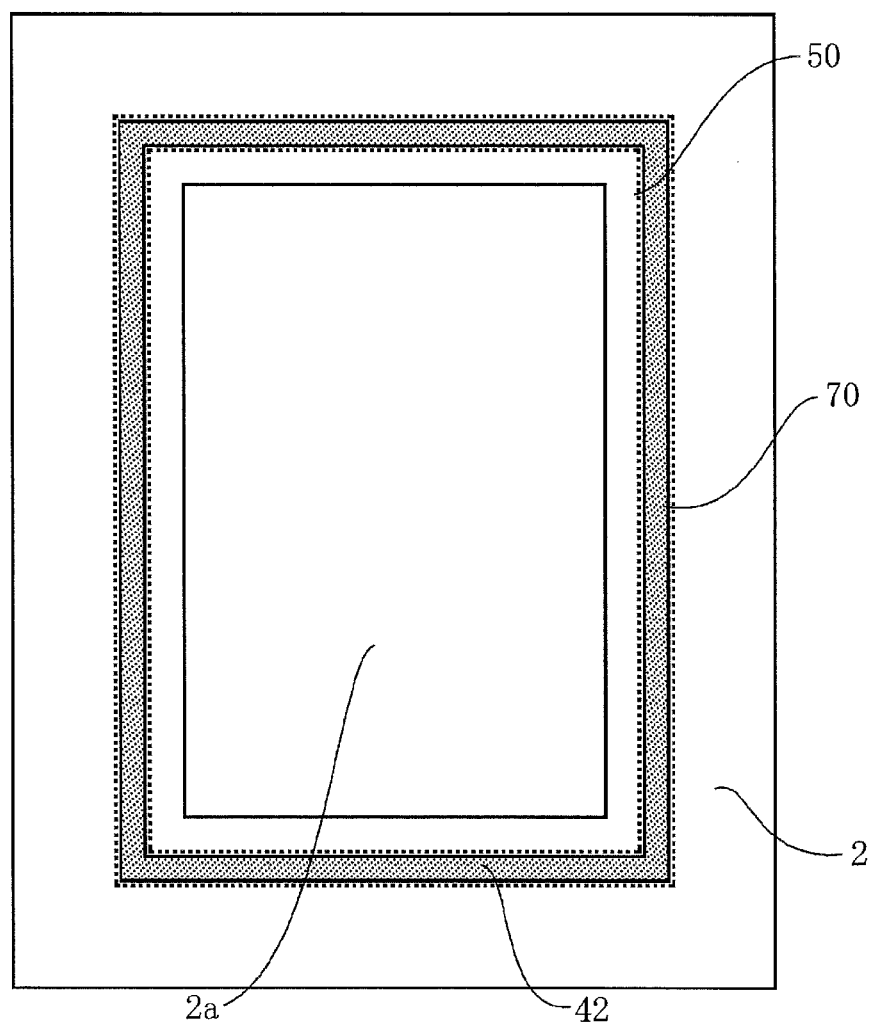
FIG. 18 is a section view showing a variation of the adhesive layer equipped film-like pressure-sensitive sensor for use in the third embodiment.
Figure 19:
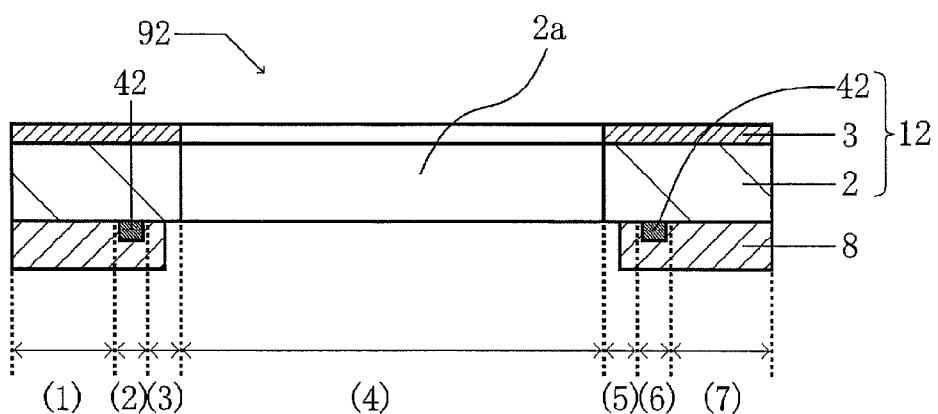
FIG. 19 is a section view showing a variation of the adhesive layer equipped film-like pressure-sensitive sensor for use in the third embodiment.
Figure 20:
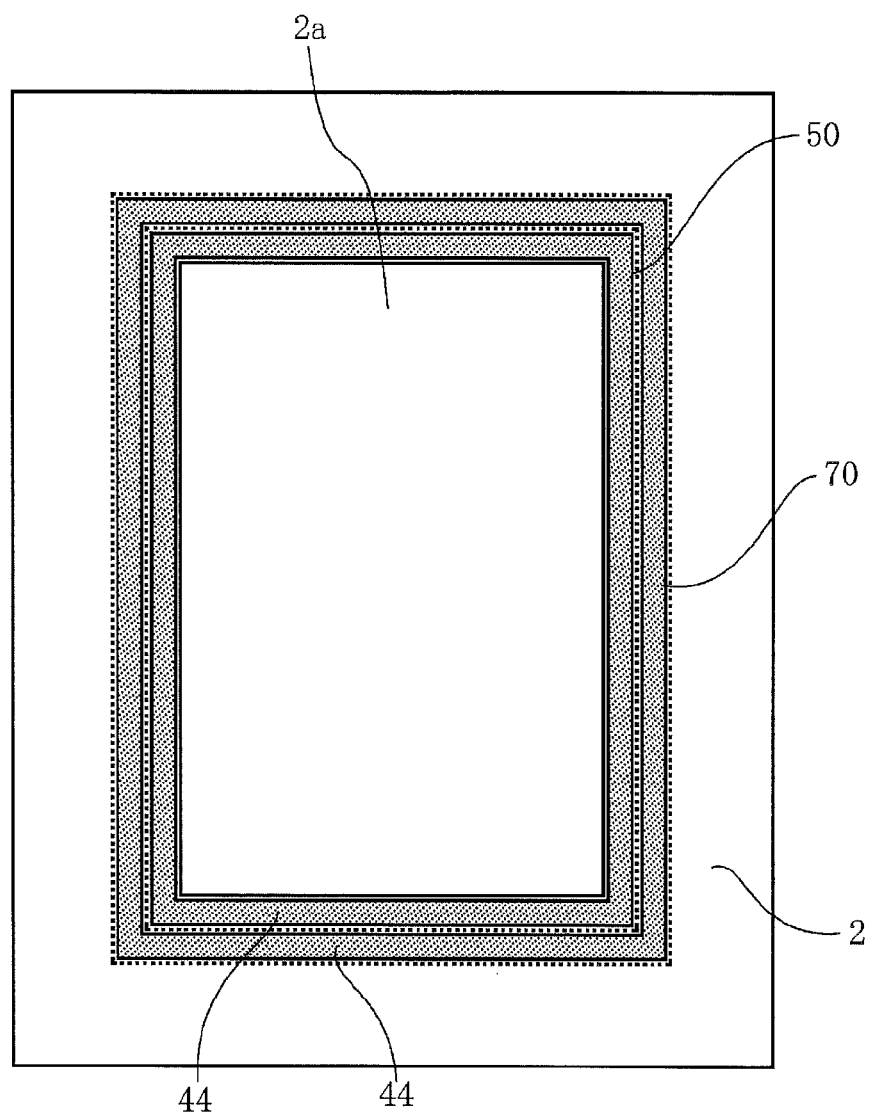
FIG. 20 is an explanatory view showing a variation of the adhesive layer equipped film-like pressure-sensitive sensor for use in the fifth embodiment.
Figure 21:
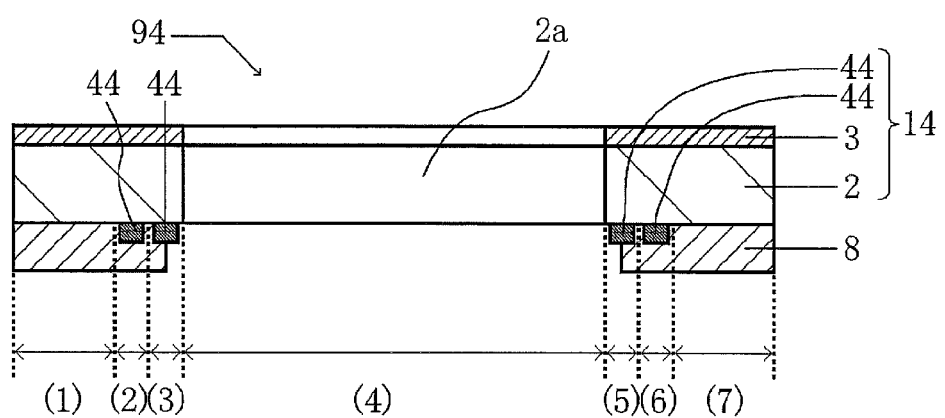
FIG. 21 is an explanatory view showing a variation of the adhesive layer equipped film-like pressure-sensitive sensor for use in the fifth embodiment.

Further, in the first through fifth embodiments, the piezoelectric film 2 is present on the entire inner side of the first frame-shaped region 50. The invention is not limited thereto. For instance, the film-like pressure-sensitive sensor 11 used in the second embodiment can be provided with a rectangular opening portion 2a which has a desired size in the inner side of the first frame-shaped region 50 (see FIG. 16 and FIG. 17). Further, the film-like pressure-sensitive sensor 12 used in the third embodiment can be provided with a rectangular opening portion 2a which has a desired size in the inner side of the first frame-shaped region 50 (see FIG. 18 and FIG. 19). Further, the film-like pressure-sensitive sensor 14 used in the fifth embodiment can be provided with a rectangular opening portion 2a which has a desired size in the inner side of the first frame-shaped region 50 (see FIG. 20 and FIG. 21). In these cases, when placed on the display unit, visibility will be improved.

[Variation 5]
<Touch Pad>

Further, in the first through fifth embodiments, the touch-input function equipped protective panel 102 is constituted by combining the adhesive layer equipped film-like pressure-sensitive sensor 14 with the touch panel 112 having the picture-frame-like ornamental pattern. Instead, a touch pad can be formed without the display unit being disposed in the rear side thereof, by combination with a touch panel whose face as a whole is non-transparent. Incidentally, in this case, the piezoelectric film 2, the detection electrodes 4, 41, 42, 43, 44 and the reference potential electrode 3 need not be transparent.

The technical contents and technical features of the present invention have been disclosed in the above. However, those skilled in the art in which the present invention belongs could make various substitutions and/or additions based on teaching or disclosure of the present invention as long as these do not depart from the essential technical concept of the present invention. Therefore, it is understood that the scope of the invention is not limited by the disclosure of the embodiments, but includes all such various substitutions and/or additions. The scope of the invention should be defined by the appended claims.

DESCRIPTION OF REFERENCE MARKS/NUMERALS 1, 11, 12, 13, 14 film-like pressure-sensitive sensor
2 piezoelectric film
2a opening portion
3 reference potential electrode
4, 41, 42, 43, 44 detection electrode
5, 6 transparent resin film
7 PSA
8 adhesive layer
9, 91, 92, 93, 94 adhesive layer equipped film-like pressure-sensitive sensor
50 first frame-shaped region
60 whole region adjacent inner side of first frame-shaped region
70 second frame-shaped region
100 touch-input function equipped electronic device
101 display unit
102 touch-input function equipped protective panel
102a picture-frame-shaped ornamental pattern
103 casing
105 panel fit-in portion
105a cavity
105b support portion
112 touch panel
113 protective panel body
113a ornamental layer
114 X-coordinate detecting transparent film
115 Y-coordinate detecting transparent film

The invention claimed is:

1. An adhesive layer equipped film-like pressure-sensitive sensor comprising:
   a film-like pressure-sensitive sensor; and
   an adhesive layer being a frame-shaped adhesive layer disposed in a rear face peripheral edge portion of the film-like pressure-sensitive sensor;
   the film-like pressure-sensitive sensor including a rectangular piezoelectric film, a detection electrode formed partially on a rear face of the piezoelectric film and a reference potential electrode formed on a front face of the piezoelectric film in such a manner as to be overlapped with the detection electrode; and
   the detection electrode being formed in a first frame-shaped region extending across an inner boundary of the adhesive layer.

2. The adhesive layer equipped film-like pressure-sensitive sensor according to claim 1, wherein the piezoelectric film has a rectangular opening portion in an inner side of the first frame-shaped region.

3. The adhesive layer equipped film-like pressure-sensitive sensor according to claim 1, wherein the detection electrode is formed on the front face of the piezoelectric film and the reference potential electrode is formed on the rear face of the piezoelectric film, in reverse arrangement.

4. The adhesive layer equipped film-like pressure-sensitive sensor according to claim 1, further comprising:
   a touch panel having a touch-input face, the touch panel being non-transparent entirely;
   wherein the touch panel and the adhesive layer equipped film-like pressure-sensitive sensor are stacked as separate members.

5. The adhesive layer equipped film-like pressure-sensitive sensor according to claim 1, further comprising:

a touch panel having a touch-input face and a picture-frame-shaped ornamental pattern;

wherein the touch panel and the adhesive layer equipped film-like pressure-sensitive sensor are stacked as separate members; and wherein the piezoelectric film, the detection electrode and the reference potential electrode thereof are transparent.

6. The adhesive layer equipped film-like pressure-sensitive sensor according to claim 1, further comprising:

a touch panel having a touch-input face and a picture-frame-shaped ornamental pattern;

wherein one of two layers of position detecting electrodes constituting the touch panel are formed by the electrode formed on the front face of the piezoelectric film; and wherein the piezoelectric film, the detection electrode and the reference potential electrode thereof are transparent.

7. The adhesive layer equipped film-like pressure-sensitive sensor according to claim 5, further comprising:

a display unit; and a casing formed concave to provide a level difference for allowing fit-in of the touch-input function equipped protective panel from the outside, the casing comprising in its bottom face a cavity or an opening portion for the display unit and a frame-shaped support portion for supporting a peripheral edge portion of the touch-input function equipped protective panel.

8. The adhesive layer equipped film-like pressure-sensitive sensor according to claim 6, further comprising:

a display unit; and a casing formed concave to provide a level difference for allowing fit-in of the protective panel with touch-input function from the outside, the casing including in its bottom face a cavity or an opening portion for the display unit and a frame-shaped support portion for supporting a peripheral edge portion of the touch-input function equipped protective panel.

9. The adhesive layer equipped film-like pressure-sensitive sensor according to claim 1, wherein the detection electrode is formed continuously in the first frame-shaped region and a whole region adjacent to an inner side of the first frame-shaped region.

10. An adhesive layer equipped film-like pressure-sensitive sensor comprising:

a film-like pressure-sensitive sensor; and an adhesive layer being a frame-shaped adhesive layer disposed in a rear face peripheral edge portion of the film-like pressure-sensitive sensor;

the film-like pressure-sensitive sensor including a rectangular piezoelectric film, a detection electrode formed partially on a rear face of the piezoelectric film and a reference potential electrode formed on a front face of the piezoelectric film in such a manner as to be overlapped with the detection electrode; and the detection electrode being formed in a first frame-shaped region extending across an inner boundary of the adhesive layer and being formed independently also in a second frame-shaped region which is located adjacent to an outer side of a first frame-shaped region and which is also disposed in an inner peripheral edge portion of the adhesive layer.

11. The adhesive layer equipped film-like pressure-sensitive sensor according to claim 10, wherein the detection electrode formed in the first frame-shaped region and the detection electrode formed in the second frame-shaped region have an approximately same width.

12. The adhesive layer equipped film-like pressure-sensitive sensor according to claim 10, wherein the detection electrode is formed continuously in the first frame-shaped region and a whole region adjacent to an inner side of the first frame-shaped region and is formed independently also in the second frame-shaped region.

13. The adhesive layer equipped film-like pressure-sensitive sensor according to claim 10, wherein the piezoelectric film has a rectangular opening portion on an inner side of the first frame-shaped region.

14. The adhesive layer equipped film-like pressure-sensitive sensor according to claim 10, wherein the detection electrode is formed on the front face of the piezoelectric film and the reference potential electrode is formed on the rear face of the piezoelectric film, in reverse arrangement.

15. The adhesive layer equipped film-like pressure-sensitive sensor according to claim 10, further comprising:

a touch panel having a touch-input face, the touch panel being non-transparent entirely;

wherein the touch panel and the adhesive-layer equipped film-like pressure-sensitive sensor are stacked as separate members.

16. The adhesive layer equipped film-like pressure-sensitive sensor according to claim 10, further comprising:

a touch panel having a touch-input face and a picture-frame-shaped ornamental pattern;

wherein the touch panel and the adhesive-layer equipped film-like pressure-sensitive sensor are stacked as separate members; and wherein the piezoelectric film, the detection electrode and the reference potential electrode thereof are transparent.

17. The adhesive layer equipped film-like pressure-sensitive sensor according to claim 10, further comprising:

a touch panel having a touch-input face and a picture-frame-shaped ornamental pattern;

wherein one of two layers of position detecting electrodes constituting the touch panel are formed by the electrode formed on the front face of the piezoelectric film; and wherein the piezoelectric film, the detection electrode and the reference potential electrode thereof are transparent.

18. The adhesive layer equipped film-like pressure-sensitive sensor of claim 16, further comprising:

a display unit; and a casing formed concave to provide a level difference for allowing fit-in of the protective panel with touch-input function from the outside, the casing including in its bottom face a cavity or an opening portion for the display unit and a frame-shaped support portion for supporting a peripheral edge portion of the touch-input function equipped protective panel.

19. The adhesive layer equipped film-like pressure-sensitive sensor of claim 17, further comprising:

a display unit; and a casing formed concave to provide a level difference for allowing fit-in of the protective panel with touch-input function from the outside, the casing including in its bottom face a cavity or an opening portion for the display unit and a frame-shaped support portion for supporting a peripheral edge portion of the touch-input function equipped protective panel.

* * * * *